Feb. 7, 1950 — H. F. ELLIOTT — 2,496,454
CONTROL DEVICE FOR RADIO TUNERS
Filed Dec. 29, 1943 — 5 Sheets-Sheet 1
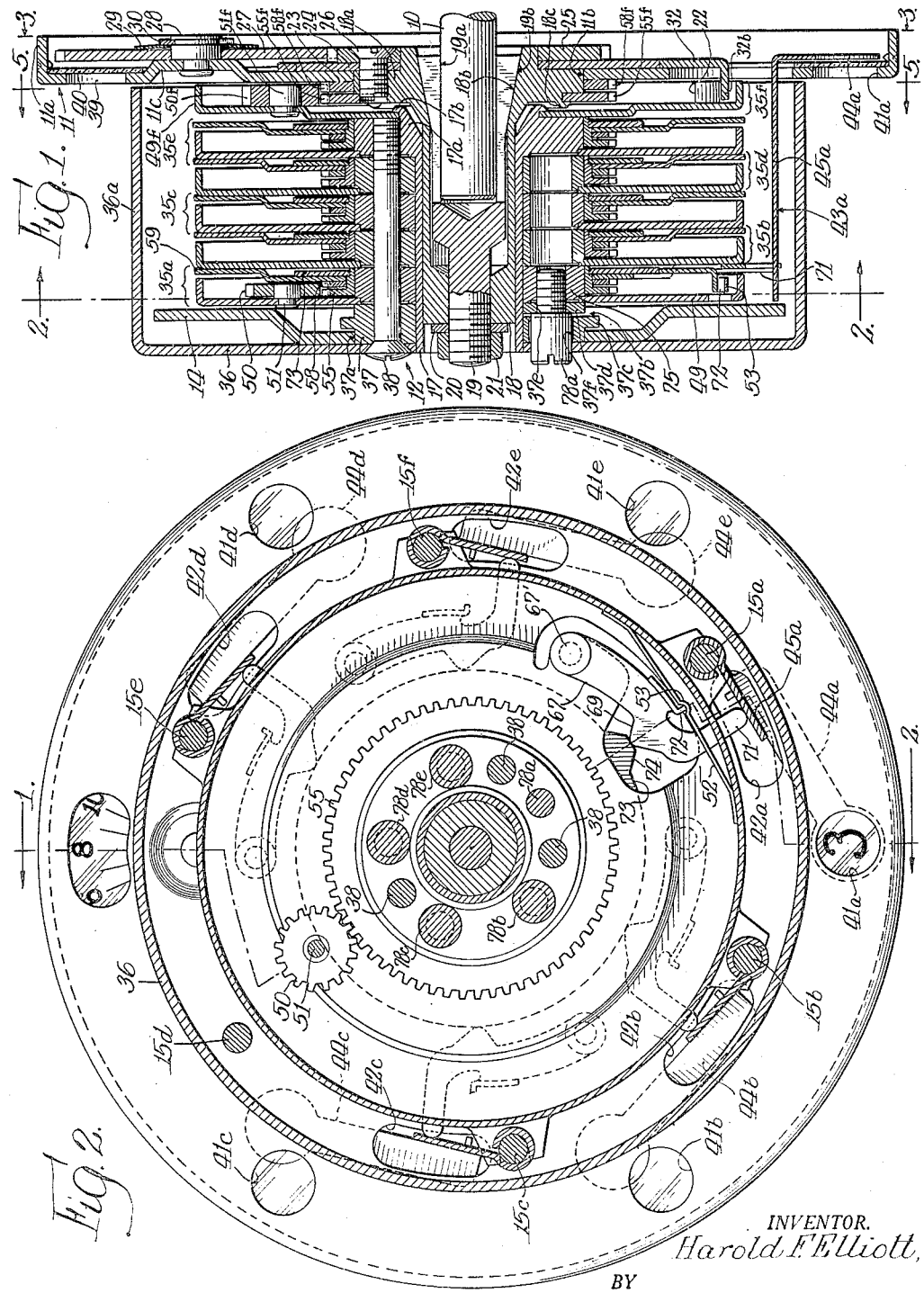
INVENTOR.
Harold F. Elliott,
BY
Forman L. Mueller
Atty.

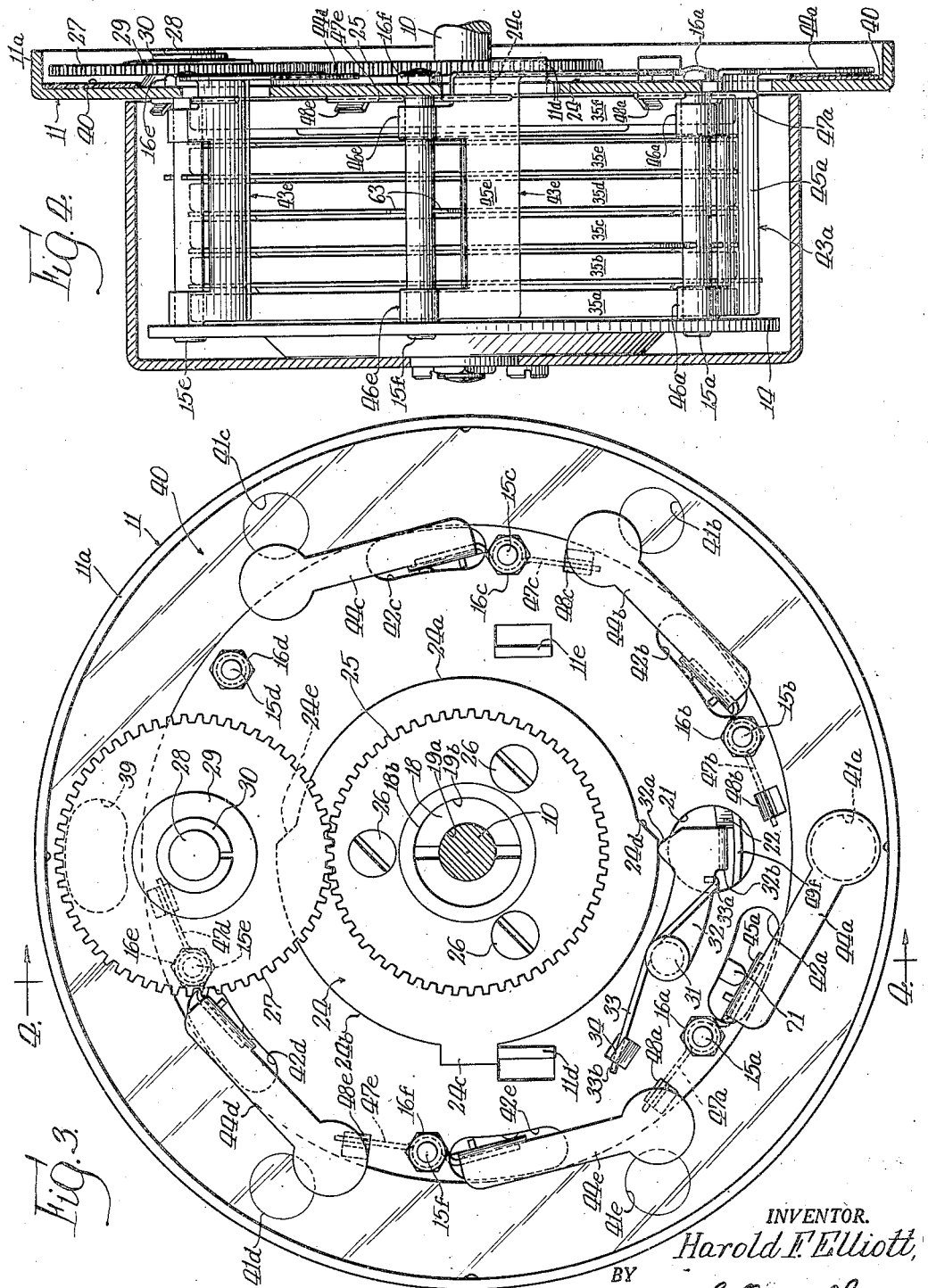

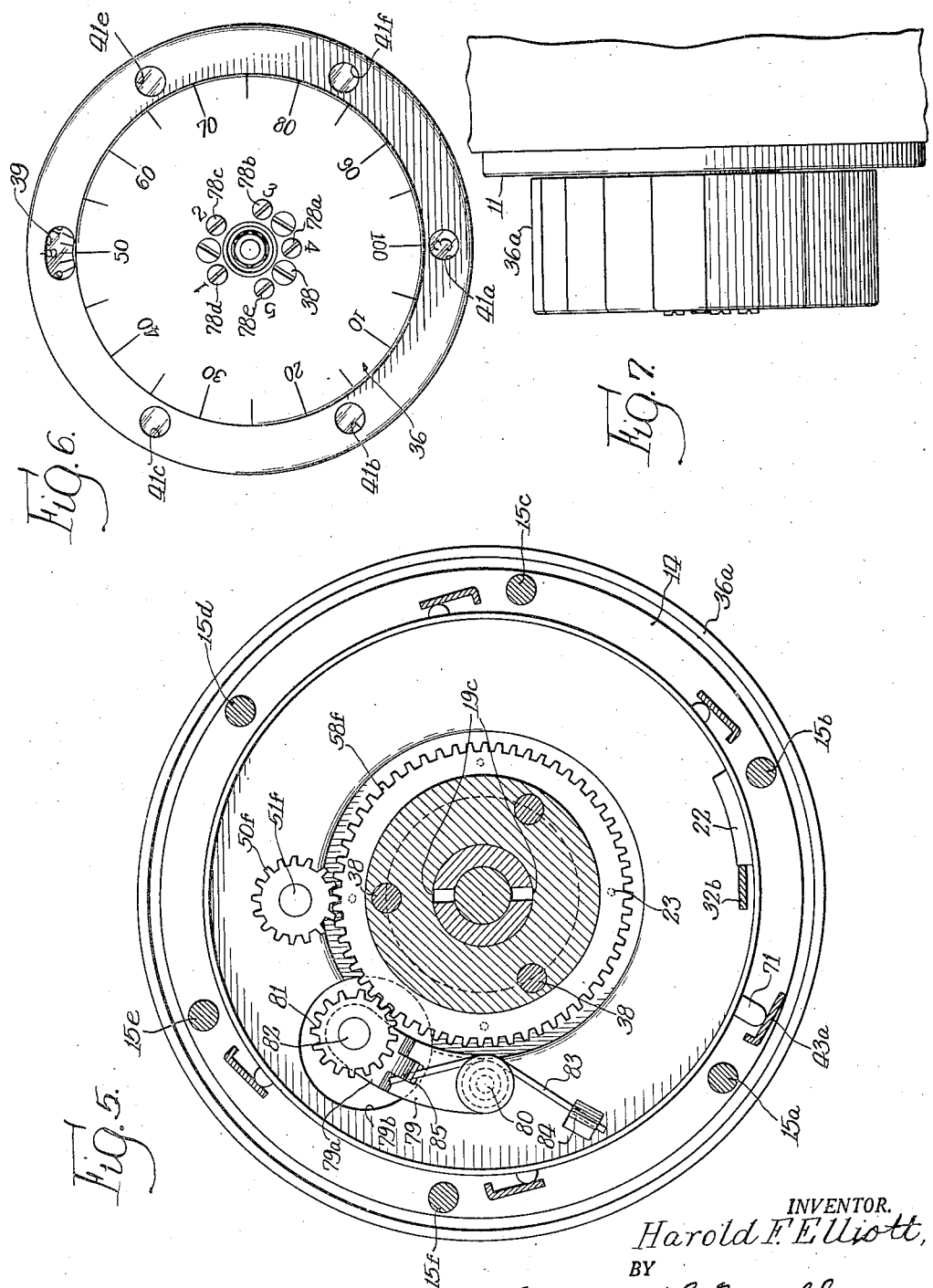

Feb. 7, 1950 H. F. ELLIOTT 2,496,454
CONTROL DEVICE FOR RADIO TUNERS
Filed Dec. 29, 1943 5 Sheets-Sheet 4
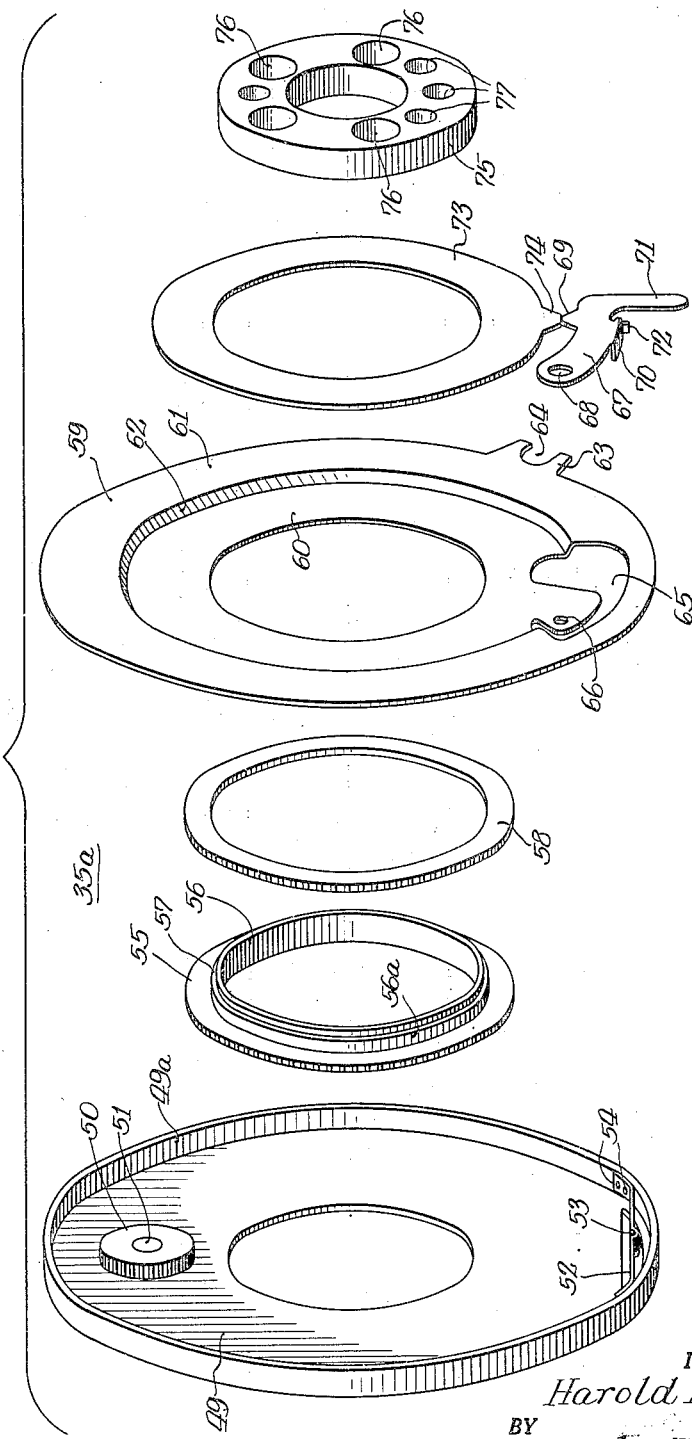
INVENTOR.
Harold F. Elliott,
BY
Faorman L. Mueller
Atty.

Feb. 7, 1950         H. F. ELLIOTT         2,496,454
CONTROL DEVICE FOR RADIO TUNERS
Filed Dec. 29, 1943         5 Sheets-Sheet 5
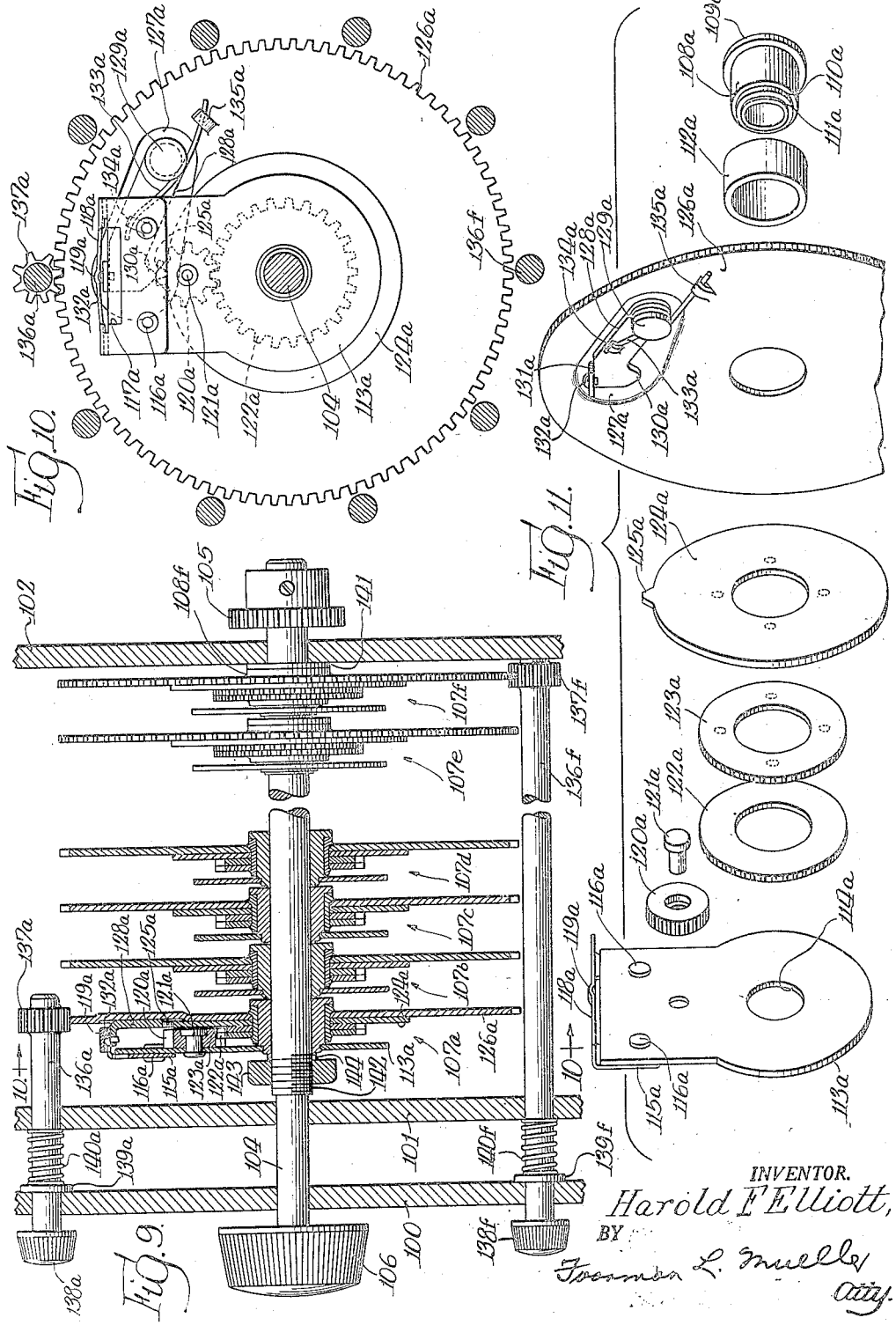
INVENTOR.
Harold F Elliott,
BY Patented Feb. 7, 1950

2,496,454

UNITED STATES PATENT OFFICE 2,496,454

CONTROL DEVICE FOR RADIO TUNERS

Harold F. Elliott, Belmont, Mass.

Application December 29, 1943, Serial No. 516,039

19 Claims. (Cl. 116—124.1)

1

The present invention relates to improvements in control devices and more particularly to an improved mechanism for identifying one or more settings of the tuning means for a radio receiver or the like.

It is an object of the present invention to provide an improved and precisely accurate control device of small size and simplified construction.

It is another object of the invention to provide an indicating mechanism of the character described which, while small in size, light in weight and positive and reliable in operation, yet is capable of indicating with precision accuracy each of a relatively large number of predetermined settings of a rotary shaft or rotatable structure.

According to another object of the invention, a plurality of separate, independently adjustable and mutually non-interfering control units, each occupying only a small space, are utilized separately to actuate different indicating devices which individually correspond to the different predetermined settings of the shaft or structure.

In accordance with still another object of the invention, an improved arrangement is provided whereby each control unit is utilized to provide both a visual indication and a touch indication of the particular setting to which the unit corresponds.

According to a further object of the invention, an improved and exceedingly simple indicating assembly, utilizing a common actuating element and requiring a minimum of space, is employed to provide both the desired visual and touch indications.

In accordance with still another object of the invention, an exceedingly simple two-part spring detent mechanism is provided in association with each control unit to provide the desired touch indication.

According to a still further object of the invention, an exceedingly compact and simple indicating arrangement, utilizing a plurality of movable semaphores or flags disposed about the rotary shaft, is provided for visually indicating the different predetermined settings of the shaft or rotatable structure.

In accordance with yet another object of the invention, the accuracy of indication is enhanced by equipping each control unit with a multi-revolution speed reducing and lost-motion mechanism arranged for a wide range of free travel, which translates movement of the rotary shaft or structure into an indication identifying the position or setting of the shaft or structure.

The invention, both as to its organization and method of operation, together with further objects and advantages thereof, will best be understood by reference to the following specification taken in connection with the accompanying drawings, in which:

Fig. 1 is a side view in full section illustrating a control device characterized by the features of the present invention;

Fig. 2 is an end view, partially in section, of the device shown in Fig. 1;

Fig. 3 is an opposite end view of the device;

Fig. 4 is a side view of the device as seen in section along the lines 4—4 of Fig. 3;

Fig. 5 is an end view of the device as viewed in section along the lines 5—5 of Fig. 1;

Fig. 6 is an end elevation view of the device;

Fig. 7 is a side view of the device;

Fig. 8 is an explosion view in perspective of the parts embodied in one of the control units provided in the device;

Fig. 9 is a side sectional view of a modified embodiment of the invention;

Fig. 10 is an end sectional view taken along the lines 10—10 of Fig. 9; and

Fig. 11 is an explosion view in perspective of the parts embodied in one of the control or indicating units provided in the device shown in Fig. 9.

Referring now to the drawings, and more particularly to Figs. 1 through 8 thereof, the improved control device there illustrated is adapted to be embodied in a radio receiver system, for example, for the purpose of selectively operating the frequency changing means of the receiver to different predetermined settings respectively corresponding to different desired signal channels and for providing visual and touch indications identifying the different signal channels. More specifically, the tuning or frequency changing means of the receiver is adapted to be actuated to any one of a plurality of different settings respectively corresponding to different stations, through manual actuation of a rotary control shaft 10. This shaft may be the usual condenser rotor shaft carrying the rotor plates of a plurality of gang connected condensers, and these condensers may be of the conventional type requiring 180° rotor rotation to cover the full capacitance range thereof. Alternatively, the shaft 10 may be geared to the condenser rotor shaft through a gear train having a 1:1 drive ratio.

Briefly considered, the improved device for adjustably and accurately rotating the shaft 10 to any desired predetermined setting is provided with a supporting structure which includes two spaced apart supporting members 11 and 14. These members are rigidly held in spaced-apart relationship by means of six tie rods 15 which are spaced apart around the peripheral edge of the member 14, have ends suitably anchored to this member, and are provided with opposite ends which are shouldered to extend through openings in the member 11. Assembly nuts 16 threaded onto the shouldered ends of the tie rods 15 are utilized to provide rigid connections between these rods and the member 11.

The member 11 rotatably supports a rotatable hub 18 which is bored, counterbored, and then taper reamed to accommodate facilities for providing a locking connection with the end of the settable shaft 10. These facilities comprise a vise member 19 having a threaded shank extending through the bored end of the hub 18 to receive a clamping nut 21 thereon and provided with a flared portion which includes an outer tapered surface 19b seating against the tapered surface 18b of the hub 18. The enlarged portion of the member 19 is bored to receive the end of the shaft 10, and the flared end thereof is provided with a longitudinally extending slot 19c which divides this portion of the member into two halves. These two halves may be contracted into clamping engagement with the end of the shaft 10 through the action of the tapered clamping surfaces 18b and 19b, as the member 19 is moved axially of the hub 18 by setting up the nut 21 upon the threaded shank of the member 19. A friction washer 20 is interposed between the nut 21 and the adjacent end of the hub 18 to facilitate rotation of the nut 21 relative to the two members 18 and 19. With the above described arrangement and with the flared end of the member 19 loosely seated within the tapered camming surface 18b of the hub 18, the two halves of this end of the member 19 are radially expanded so that the end of the shaft 10 may be easily inserted into the bore 19a. After the two parts 10 and 19 are thus brought into assembled relationship, the nut 21 may be tightened to move the member 19 axially to the left as viewed in Fig. 1 of the drawings. During such axial movement of the member 19, the tapered clamping surfaces 18b and 19b coact to contract the two halves of the split flared end of the member 19 into clamping engagement with the end of the shaft 10. Thus, a rigid locking connection may be provided between the hub 18 and the end of the shaft 10, and this locking connection may be accomplished from the front of the device by the simple expedient of tightening the nut 21.

In order to impart rotary movement to the shaft 10, thereby to set the connected tuning device in a desired tuning position, a rotary actuating structure is provided which comprises a cup-shaped dial 36 of suitable size for finger manipulation, a supporting sleeve 17, and six control units 35a, 35b, 35c, 35d, 35e and 35f. The six control units are disposed in end-to-end relationship axially of the sleeve 17, and together with the supporting member 14 and tie rods 15, are housed within the tubular rim 6a of the cup-shaped dial 36. As shown in Fig. 7 of the drawings, the rim portion of the dial 36 is provided with flatted surfaces in order to facilitate finger manipulation thereof. The first five control units 35a to 35e, inclusive, are respectively utilized in the manner described below to indicate five different predetermined settings of the shaft 10, and each thereof includes a stepped bushing 75 of annular configuration which snugly embraces the outer surface of the sleeve 17. Support for the parts of the fifth control unit 35e is provided by the stepped flanged portion 17a of the sleeve 17. The four annular bushings 75, together with an end bearing ring 37 and the dial 36, are stacked axially of the sleeve 17 and are clamped to the flange portion of this sleeve by means of three assembly screws 38. These screws extend through registering openings through the parts of the stack and are threaded into tapped openings drilled into the flange 17a in the manner best shown in Fig. 1 of the drawings. At its left outer edge, the bearing ring 37 is provided with a shouldered portion 37a which is journaled within an opening through the end supporting member 14. It will thus be apparent that the rotary actuating structure for imparting rotary movement to the shaft 10 comprises the sleeve 17, the four annular bushings 75, the bearing collar 37, and the dial 36, and that this structure is in part rotatably supported by the end supporting member 14 and in part by the bearing surface provided by the member 18. Rotary movement is transmitted from this structure to the rotary control shaft 10 through the sixth control unit 35f, one part 49f of which is secured by means of a lip 17b to the face of the flange 17a for rotation with the rotary structure, and two other parts of which are carried upon the enlarged portion 18a of the hub 18 to the front side of the supporting member 11, in the manner pointed out below. The six control units are of substantially identical construction and arrangement. Accordingly, the arrangement of these units will be readily understood from a consideration of the control unit 35a, the parts of which are detailed in Figs. 1, 2 and 8 of the drawings.

In brief, this control unit comprises a cup-shaped actuating member 49 which is mounted for rotation with the rotary structure and more particularly with the dial 36, and a combination speed reducing and lost-motion mechanism. This mechanism comprises a pair of relatively rotatable gears 55 and 58, the first of which is mounted for rotation with an annular bearing member 56 upon which the second gear 58 is journaled; an orbital or planetary gear 50 which is pivotally mounted by means of an axis pin 51 upon the driving element or member 49 for meshing engagement with the two gears 55 and 58; a supporting disc 59 which is held stationary and embraces the portion 56a of the member 56 adjacent the gear 58; a camming element in the form of a ring 73 which is welded or pinned to the shouldered portion 57 of the member 56 for rotation therewith about the bushing 75 and is provided around its outer periphery with a cam lobe 74; a cam follower 67 which is pivotally supported upon the disc 59 by means of a pin 67' extending through the openings 66 and 68 and is provided with a cam lobe 69 which is adapted to be engaged by the lobe 74 of the ring 73 when predetermined relative positions of the two gears 55 and 58 are established; and a detent spring 52 of flat form which is secured to the inner surface of the actuating member rim 49a by means of pins 54 and is provided with a recess 53 midway therealong adapted for engagement by the detent finger 72 of the cam follower 67 when this cam follower is actuated by the cam ring 73. The gear 58 of the control unit is provided with a different number of teeth than the associated gear 55 so that during operation of the associated driving element 49, the gear 55 is rotated relative to the associated driving element but at a much slower speed. For example, if the gear 58 is provided with sixty-two teeth and the gear 55 is provided with sixty teeth, a 30:1 drive ratio is provided between the member 49 and the gear 55, such that the gear 55, the sleeve 56 and the cam ring 73 are rotated one revolution for each thirty revolutions of the actuating member 49. Thus, the five elements 49, 50, 55, 56 and 58 combine to form an exceedingly compact differential gear assembly through which the cam ring 73 may be rotated at slow speed in response to high speed rotation of the driving element 49.

As indicated above, the flange portion 17a of the sleeve 17, the four bushings 75, and the bearing ring 37 are utilized to support the parts of the five control units 35a, 35b, 35c, 35d, and 35e. More specifically, the actuating member 49 of the control unit 35a is normally clamped between the bearing ring 37 and the adjacent bushing 75, the actuating member 49 of the control unit 35e is normally clamped between the flange 17a and the adjacent bushing 75, and the actuating members 49 of the three intermediate control units 35b, 35c, and 35d are clamped between different adjacent pairs of the four bushings 75 stacked axially along the sleeve 17. With this arrangement, the actuating members 49 of the five control units 35a to 35e, inclusive, together with the actuating member 49f of the control unit 35f, are all mounted for rotation with the dial 36, and the three connected parts 55, 56 and 73 of each control unit are rotatable about the bushings 75 upon which they are respectively journaled. The manner in which the actuating members 49 may be adjustably positioned relative to the dial 36 is pointed out more fully below. The parts 58 and 59 of each unit are pinned, welded, or otherwise rigidly secured together, and are held stationary by means of an ear 63 carried by the disc 59 and having a recess 64 therein which embraces one of the tie rods 15. As best shown in Figs. 1 and 8 of the drawings, each disc 59 includes two laterally offset portions 60 and 61 which are joined by a connecting portion 62, these three portions commonly including different parts of an opening 65. That portion of the disc 59 which carries the pivot pin 67' for the cam follower 67 is disposed in the same plane as the inner portion 60 of the disc, so that the main body portion of the cam follower 67, including the cam lobe 69, is disposed upon the right side of the disc 59 in order to permit actuation of the follower by the cam ring 73, and the detent finger 72 and actuating finger 71 are disposed upon the left side of the outer portion 61 of the disc. This arrangement provides for full utilization of the available thickness through the control unit and thus minimizes the axial length of the structure required to accommodate a given number of control units.

As will be apparent from the above description, the coacting detent parts 72 and 52 of each control unit are utilized to provide a touch indication identifying a particular setting of the rotary structure comprising the dial 36. Each control unit 35 is also utilized concurrently to provide a visual indication of the particular setting of the rotary structure and shaft 10. To this end, the actuating finger 71 of each cam follower 67 is projected through the gap between the outer peripheral portion of its associated supporting disc 59 and the rim of its associated actuating member 49 to actuate an associated indicating device 43. More specifically and as best shown in Figs. 1, 3 and 4 of the drawings, the control unit 35a, and more directly the cam follower 67 of this unit, is arranged to actuate an associated indicating device 43a which is pivotally supported by means of legs 46a upon the tie rod 15a and is provided with an axially extending portion 45a which overlies the actuating finger 71 of the cam follower 67 provided in the control unit 35a. This indicating device also includes a projecting end portion which extends through a slot 42a in the supporting member 11 and carries a flag or semaphore part 44a at the back side of this supporting member. This semaphore 44a is provided with a bulbous indicating end which is adapted to be moved into registry with a viewing window 41a cut through the supporting member 11, and may have inscribed upon the front surface thereof a suitable legend which indicates or identifies the particular signal channel, for example, to which the indicating device corresponds. Normally, i. e., when the rotary structure including the dial 36 occupies any other position than that to which the indicating device 43a corresponds, the semaphore 44a is restrained to a position out of registry with the window 41a in order to prevent the legend carried thereby from being viewed through this window. To this end, the axially extending portion of the device 43a is held in tensioned engagement with the actuating finger 71 of the associated cam follower 67 by means of a wire spring 47a. This spring includes an end portion which overlies the projecting end portion of the device 43a, a central portion which half embraces the tie rod 15a, and an opposite end portion which is anchored by means of a lug 48a stuck out from the face of the supporting member 11. With this arrangement, the semaphore or flag 44a is normally restrained radially toward the shaft 10 out of registry with the viewing window 41a, and may be operated to its display position in registry with this window by the control unit 35a when the shaft 10 is moved to the particular setting which this control unit is provided to identify. The arrangement of the other four indicating devices 43b, 43c, 43d, and 43e is exactly the same as the described arrangement of the device 43a, these devices being respectively pivotally supported upon the tie rods 15b, 15c, 15e and 15f about the control units and being provided with flags or semaphores 44b, 44c, 44d and 44e which respectively extend through openings 42b, 42c, 42d and 42e in the supporting member 11 and are arranged respectively to be viewed through viewing windows 41b, 41c, 41d and 41e spaced about the outer surface of the supporting member 11. These four indicating devices are normally biased to positions such that the flags thereof cannot be viewed through the respective associated viewing windows by means of wire springs 47b, 47c, 47d and 47e which respectively include end portions overlying the projecting end portions of the devices, and opposite end portions which are respectively anchored at lugs 48b, 48c, 48d and 48e stuck out from the face of the supporting member 11. In this regard it is noted that the ears 63 of the different supporting discs 59 are respectively anchored by different ones of the tie rods 15b, 15c, 15e and 15f in order that the actuating fingers 71 of the cam followers 67 respectively carried thereby may be suitably positioned for actuation of the different indicating devices 43b, 43c, 43d and 43e.

As indicated above, the sixth control unit 35f is utilized to transmit rotary movement through the shaft 10 during rotation of the dial 36 and the other parts of the rotary structure. This unit comprises the actuating member 49f mounted for rotation with the dial 36, and a differential speed reducing mechanism for rotating the connected parts 18, 19 and 10 only a fraction of a revolution in response to each complete revolution of the rotary structure. More specifically, this differential speed reducing mechanism comprises a pair of relatively movable gears 55f and 58f, the first of which is mounted to rotate the parts 18, 19 and 10 by means of a lip 18c which rigidly holds this gear upon a shoulder provided in the enlarged portion 18a of the member 18. The second gear 58f is pinned or spot welded, as indicated at 23, to the front side of the supporting member 11. These two gears are in meshing engagement with an orbital gear 50f which is rotatably mounted upon the actuating member 49f by means of an axis pin 51f, and the gear 58f is provided with a different number of teeth than the associated gear 55f so that during rotation of the actuating member 49f to rotate the orbital gear 50f about the two gears 55f and 58f, the gear 55f is rotated at a reduced rate relative to the dial 36. Thus, if the gear 55f is provided with sixty teeth and the gear 58f is provided with sixty-one teeth, a 60:1 drive ratio is provided between the driving or actuating member 49f and the shaft 10, such that this shaft is rotated through an angle of 180 degrees for each thirty revolutions of the dial 36. In this regard it is noted that the free travel range of the lost-motion part 73 as provided in each control unit should substantially equal, if not exceed, the rotational range of the rotary structure. Thus if the rotational range of the dial 36 is limited to thirty revolutions, the tooth ratio between the gears 55 and 58 should be such that thirty revolutions of the dial will not rotate the associated cam ring through more than one revolution. This permits complete flexibility in the adjustment of the control units to identify different settings of the shaft 10, while obviating the possibility that any unit will indicate more than one shaft setting.

For the purpose of eliminating backlash between the two gears 55f and 58f, thereby to maintain predetermined relative positions between the shaft 10 and the rotary structure during rotation of the shaft 10 in response to rotation of the rotary structure, an idler pinion 81 is provided which is spring biased to partially mesh with the two identified gears at a point removed from the point of engagement of these gears with the orbital gear 50f. More specifically and as best shown in Fig. 5 of the drawings, the idler pinion 81 is rotatably mounted by means of an axis pin 82 upon an offset portion 79a of a supporting arm 79. This portion of the arm 79 is disposed within an opening 79b through the actuating member 49f, and the arm itself is pivotally mounted upon the actuating member by means of an axis pin 80. A wire spring 83 wrapped around the axis pin 80 is utilized to bias the idler pinion 81 into meshing engagement with the two gears 55f and 58f. This spring is provided with one end arranged in tensioned engagement with a stuck out lug 85 formed integral with the arm 79, and with an opposite end which is tensioned against a lug 84 stuck out from the wall of the actuating member 49f. With this arrangement, the spring 83 continuously urges the pinion 81 into deeper meshing engagement with the teeth of the two gears 55f and 58f, partial engagement only being permitted due to the fact that, at the point of engagement of the pinion with the two identified gears, the engaged teeth are slightly offset with respect to each other. As a result, lost-motion between the two gears 55f and 58f is entirely eliminated.

In order to limit the rotary movement of the shaft 10 to one-half of a revolution, a stop disc 24 is provided, Fig. 3, which is rigidly mounted upon a shouldered portion of the member 18 to the rear of the supporting member 11 and includes a stop projection 24c arranged to engage stop lugs 11d and 11e struck out from the wall of the supporting member 11 and disposed in the path of rotation of the projection 24c. The disc 24 is also utilized directly to lock the rotary actuating structure against continuous rotation when the shaft 10 is rotated to either limit of its range of rotational movement. To this end, the disc 24 is provided with a portion 24a of reduced diameter and a portion 24b of greater diameter which are connected by two camming surfaces 24d and 24e at the adjacent ends thereof. These camming surfaces are utilized to pivot a stop arm 32 into a position for engagement by a stop 22 carried within the rim of the actuating member 49f when the shaft 10 is rotated to either end of its rotational range by the rotary structure. More in detail, the stop arm 32 is pivotally supported upon the back side of the supporting member 11 by means of an axis pin 31 and is provided with a cam follower lobe 32a which is biased to engage the periphery of the disc 24 by means of a wire spring 33. This spring is wrapped around the axis pin 31 and is anchored at one end to a lug 34 struck out from the wall of the supporting member 11. At its opposite end, the spring 33 is bent over the edge of the arm 32 adjacent the free end of this arm so that the tension therein tends to pivot the arm about the pin 31 in a direction to maintain the lobe 32a and the periphery of the disc 24 in engagement. At its free end, the stop arm 32 is also provided with a part 32b which extends through an opening 21 in the supporting member 11 into the path of movement of the stop element 22 which is rigidly mounted upon the rim of the actuating member 49f at the inner side thereof.

For the purpose of at all times visually indicating the exact setting of the shaft 10 in terms of the rotational displacement of the rotary actuating structure from one limit of its range of travel, a turn indicating assembly is provided which includes a gear 25 mounted for rotation with the shaft 10 and meshing with a gear 27. The gear 25, together with the disc 24, are clamped to the enlarged and shouldered portion 18a of the member 18 by means of three assembly screws 26 which are threaded into tapped openings in the indicated portion of the member 18. The engaging gear 27 is mounted for rotation about a pivot pin 28, this pin being mounted centrally of a well 11c stamped inwardly from the face of the supporting member 11. It is retained upon the axis pin 58 by means of a spring washer 29 and a spring clip 30, the latter element being seated within an annular recess cut around the surface of the pin 28 at the right end thereof. With this arrangement, the major portion of the face of the gear 27 is held away from the back side of the supporting member 11 to permit rotation thereof with a minimum of friction, and the disc 24 serves as a spacing member in order properly to position the gear 25 for meshing engagement with the gear 27. At its front side, the gear 27 is provided with an arcuate scale which is calibrated in terms of revolutions of the dial 36 and the indicia of which may be viewed through a viewing window 39 cut through the assembly member 11. An index line disposed centrally of the window 39 may be utilized in conjunction with the markings of this scale in order accurately to indicate the exact setting of the dial 36. If desired, or the operating conditions require, the viewing windows 39 and 41 cut through the supporting member 11 may be sealed by means of an annular strip 40 of suitable translucent material, such, for example, as glass. This strip may be cemented or otherwise suitably secured to the supporting member 11 within the rim 11a thereof.

In considering the operation of the above-described device, it may be assumed that the parts thereof are so positioned that the stop projection 24c is in engagement with the stop lug 11d and the stop part 32b engages the stop element 22, and that the dial 36 is actuated to rotate the shaft 10 from the indicated extreme position thereof to the opposite extreme position thereof. To this end, the dial 36 and the remaining parts of the rotary structure are rotated in a clockwise direction as viewed in Fig. 2 of the drawings. During such rotation of the dial 36, the actuating members 49 individual to the six control units are rotated therewith, whereby the orbital gear 50f is rotated about the two gears 55f and 58f. During each revolution of the actuating member 49f and dial 36, the gear 55f is rotated counterclockwise a distance of one tooth relative to the stationary gear 58f to rotate the shaft 10 through a corresponding angle of 6 degrees. As rotation of the rigidly connected parts 18, 19, 10, 24, 25 is thus produced and more particularly during the first revolution of the actuating member 49f, the stop 22 is moved away from the stop part 32b of the arm 32, and the disc 24 is rotated to move the stop projection 24c away from the lug 11d. The extent of rotation of the disc 24 which occurs during the first revolution of the actuating member 49f is sufficient to permit the lobe 32a of the stop arm 32 to ride down the inclined camming surface 24d to a position in engagement with the surface 24a of reduced diameter. Thus, the stop part 32b of the arm 32 is moved out of the path of rotation of the stop 22 during the first revolution of the member 49f. During continued rotation of the shaft 10, the lobe 32a continues to ride over the surface 24a and the stop projection 24c continues to move away from the lug 11d. In the specific arrangement described, wherein a 60:1 drive ratio is provided between the dial 36 and the shaft 10, thirty revolutions of the dial 36 are required in order to rotate the shaft 10 from one limit of its angular movement to the other. During the thirtieth revolution of this dial and the actuating member 49f rotated therewith, the camming surface 24e rides beneath the cam lobe 32a so that the stop arm 32 is pivoted radially outward to position the stop part 32b thereof in the path of movement of the stop 22. Concurrently with the engagement of these two stops at the end of the thirtieth revolution of the dial 36, the stop projection 24c is moved into engagement with the stop lug 11e, thereby positively to arrest rotation of the shaft 10 as well as rotation of the dial 36 and other parts of the rotary structure.

At all times during the rotary movement of the shaft 10, the turn indicating gear 27 is driven by the gear 25 to provide an exact indication of the number of revolutions through which the dial 36 has been turned. Thus, the indicia of the scale provided at the front side of the gear 27 are successively brought into registry with the index mark disposed centrally of the viewing window 39 to indicate at any time the exact setting of the dial 36 and hence the shaft 10. If desired, the dial 36 may be provided around its face periphery with suitably numbered scale graduations adapted to be indexed with the index for the scale on the gear 27 to give vernier readings between the divisions of the scale on this gear. Thus and as shown in Fig. 6 of the drawings, the graduations 0–100 appearing upon the face of the dial 36 may be indexed with the index for the scale of the gear 27, so that a four place reading of the setting of the apparatus controlled by the device is provided. The first two places are indicated by the scale on the gear 27 and the last two places are indicated by the scale on the dial 36 which rotates once for each division of the scale on the gear 27. For example, a reading of 25.83 might be obtained, the 25 being derived from the scale on the gear 27, and the .83 being derived from the scale on the dial 36. The manner in which the shaft 10 may be reversely rotated to its starting position in response to reverse rotation of the dial 36 will be clearly apparent from the above explanation. It will also be apparent that within the limits of rotation defined by the action of the stop assemblies including the parts 24, 11d, 11e, 32 and 22, the shaft 10 may be rotated in either direction over any desired part of its range of movement.

During operation of the dial 36 to rotate the shaft 10 from one end of its rotational range to the other, visual and touch indications of five different predetermined settings of the shaft 10 are provided through the action of the five control units 35a to 35e, inclusive. Thus, as the actuating member 49 of the control unit 35a is rotated with the dial 36, the orbital gear 50 carried thereby is rotated about the stotionary gear 58 and the rotatable gear 55. As a result, the gear 55 of this control unit and the camming ring 73 connected therewith are rotated relative to the stationary gear 58 and the disc 59 at a rate of one revolution for each thirty revolutions of the dial 36. So long as the shaft 10 is being rotated over a portion of its range which does not embrace the predetermined setting to which the control unit 35a corresponds, the cam lobe 69 of the cam follower 67 rides over the edge of the cam ring 73 out of engagement with the lobe 74. In this regard it will be noted that the wire spring 47a in its action to bias the portion 45a of the indicating device 43a into engagement with the end of the associated actuating finger 71, functions to bias the cam lobe 69 of the cam follower 67 into engagement with the peripheral edge of the cam ring 73. Accordingly, the detent finger 72 of this cam follower is held in a position such that it cannot engage the detent spring 52 carried by the actuating member 49 of the control unit. As the shaft 10 is rotated to the particular setting which the control unit 35a is to identify, however, the cam ring 73 is rotated to a position wherein the lobe 74 engages the lobe 69 of the cam follower 67. Such engagement of the two lobes 74 and 69 initially occurs at the start or a succeeding point of the last dial revolution required to rotate the shaft 10 to the exact angular setting which the control unit 35a is to identify. It occurs, moreover, regardless of the direction in which the cam ring 73 is being rotated relative to the stationary disc 59 and the parts 58 and 67 supported thereon. When the camming surfaces of the two lobes 74 and 69 are moved into engagement, the free end of the arm 67 is moved radially outward to a position such that during the final portion of the indicated last dial revolution, the detent finger 72 engages the leaf spring 52 carried by the actuating member 49. Thereafter and when the shaft 10 is exactly positioned in the setting to which the control unit 35a corresponds, the detent finger 72 drops into the depression 53 provided centrally along the leaf spring 52. Thus, a yielding stop connection is provided by the detent parts 72 and 52 when the shaft 10 is exactly set in one of its predetermined settings. This yielding stop connection serves in a fully apparent manner to resist continued rotation of the dial 36 and the other parts of the rotary structure, so that a touch indication is provided which informs the operator that a predetermined setting of the shaft 10 has been reached. The approach to this setting is, moreover, indicated before it is reached, through the initial and continued engagement of the detent finger 72 with one or the other of the two portions of the leaf spring 52 disposed upon opposite sides of the depression 53. Accordingly, the operator may slow down the speed of rotation of the dial 36 as the desired setting is approached in order to prevent any possibility of overshooting this setting.

If the particular shaft setting identified by the control unit 35a happens not to be the desired setting, rotation of the dial 36 may be continued in the same direction until the desired setting, as identified through the action of another of the control units, is reached. In this regard it will be understood that following engagement of the detent finger 72 and the spring 52, and particularly when this finger is seated in the depression 53, an increase in the force exerted upon the dial 36 is required in order to continue rotation of this dial in the same direction. The extent of this increased force is of course determined by the stiffness of the spring 52. After engagement of the detent finger 72 with the depression 53 and during continued rotation of the dial 36, the cam lobe 74 of the ring 73 provided in the control unit 35a rides from beneath the lobe 69 of the associated cam follower 67, thus permitting the wire spring 47a to retract the follower 67 radially inward to a position such that the detent finger 72 is no longer disposed in the path of movement of the spring 52. This operation is completed during the first revolution of the dial 36 and actuating member 49 which follows engagement of the detent finger 72 with the spring depression 53.

The touch indication provided through engagement of the detent finger 72 with the spring 52 in the manner just explained, is supplemented through the action of the indicating device 43a to provide a visual indication through the window 41a which identifies the particular shaft setting. Thus, as the cam follower 67 is pivoted radially outward through engagement of the cam lobes 69 and 74, the actuating finger 71 of the cam follower 67 pivots the device 43a about the tie rod 15a until the flag 44a, or more properly the bulbous end of this flag, is moved into registry with the viewing window 41a. The numerical or other legend thus displayed through the window 41a serves to identify the particular shaft setting which has been reached. Thus, the visual indicating device 43a may be utilized to provide a rough identification of one predetermined setting of the shaft 10, whereas, the detent parts 72 and 52 of the control unit 35a may be relied upon to indicate exactly when this particular setting is reached during rotation of the dial 36. As the shaft 10 is rotated through this setting, the wire spring 47a acts to pivot the indicating device 43a back to its nondisplay position, wherein the bulbous end of the flag 44a is out of registry with the viewing window 41a.

The manner in which the other four control units 35b, 35c, 35d and 35e and their respective associated indicating devices 43b, 43c, 43d and 43e function to provide touch and visual indications identifying four other predetermined settings of the shaft 10 intermediate the limits of the rotational range of this shaft, is exactly the same as just explained with reference to the mode of operation of the control unit 35a and its associated indicating device 43a. From this explanation it will be understood that as the shaft 10 is rotated from one limit of its range of movement to the other, the various control units are concurrently operated and successively function to provide the desired indications identifying the different shaft settings. It will also be apparent that each control unit and associated indicating device will function to provide the desired indications regardless of the direction of rotation of the dial 36, and that the indications which are provided by the five control units are supplemented through the action of the turn counting assembly comprising the two meshing gears 25 and 27.

In order to provide for adjustment of the actuating members 49 relative to the dial 36, thereby to change the shaft settings to which the five units 35a, 35b, 35c, 35d and 35e individually correspond, facilities are provided for releasably clamping these actuating members against movement relative to the other parts of the rotary structure. These facilities include five clamping screws 78a, 78b, 78c, 78d and 78e which are spaced around the sleeve 17, individually correspond to different ones of the control units, and penetrate the stacked bushings 75 different distances. More specifically, the inner peripheral portion of each actuating member 49 is seated upon a bearing surface of reduced diameter which is formed by turning the associated bushing 75 or the bearing part 17a around the left edge of its outer periphery as viewed in Fig. 1 of the drawings. The axial width of the seat thus formed for an actuating member 49 is slightly less than the transverse thickness of the seated actuating member. The clamping screws 78a, 78b, 78c, 78d and 78e, disposed radially about the sleeve 17, are utilized in cooperation with portions of the end bearing ring 37 and the four bushings 75 to releasably lock the actuating member 49 against rotation relative to the dial 36 and the sleeve 17. More specifically, a sector of each ring is divided axially of the sleeve 17 into two parts by splitting the ring radially inward from the outer periphery thereof to provide a slot between the two opposed ring portions. Thus the outer bearing ring 37 is provided with a slot 37b through a sector thereof which divides this sector into two separated but integral portions 37c and 37d. Centrally of this slot, the portion 37b is drilled to provide an opening 37e for receiving the shank portion of the clamping screw 78a. In axial coincidence with this drill hole, the portion 37b is bored to provide an opening 37f for receiving the enlarged head portion of the screw 78a. The threaded shank portion of this screw is adapted to be threaded into a tapped opening provided in the first bushing 75 and disposed in axial alignment with the openings 37e and 37f. With this arrangement, the portion 37b of the bearing ring 37 may be tightly clamped against the adjacent edge of the actuating member 49 in the control unit 35a as the clamping screw 78 is threaded into the opening provided in the first bushing 75.

From the above explanation it will be understood that the bearing ring 37 and the four bushings 75 are each provided with a number of openings therethrough around the face surfaces thereof. Thus, the ring 37 not only includes the two aligned openings 37e and 37f therethrough, but is additionally provided with four openings for accommodating the enlarged head portions of the four other clamping screws 78b, 78c, 78d and 78e. The first bushing, i. e. that next adjacent the bearing ring 37, is provided with a split sector for clamping the actuating member 49 of the second control unit 35b to the second bushing, which sector includes openings corresponding to the openings 37e and 37f of different diameters through the ring 37. This bushing also includes the tapped drill hole for receiving the threaded shank of the clamping screw 78a and three larger openings for receiving the enlarged heads of the three clamping screws 78b, 78d and 78e. The second bushing is provided with a tapped opening for receiving the threaded shank of the clamping screw 78b and likewise has a split sector for permitting the actuating member 49 of the third control unit 35c to be clamped to the third bushing by means of the clamping screw 78c. In addition, the second bushing includes openings for accommodating the enlarged heads of the two clamping screws 78d and 78e individual to the control units 35d and 35e. It will thus be apparent that the clamping screws 78a, 78b, 78c, 78d and 78e are required to enter the ring and bushing stack for different distances and hence are of progressively increasing lengths in the order of their enumeration. More specifically, the threaded shank portions of these screws are of the same length, only the enlarged head portions of the screws being of progressively increasing lengths.

From the above explanation it will be clearly apparent that by manipulating the clamping screws 78, which are accessible at the front of the dial 36, the actuating members of the different control units may be set and reset at will. Thus, in order to change the setting of the actuating member 49 provided in the control unit 35a relative to the dial 36 to provide for the identification of a different predetermined setting of the shaft 10 by this control unit, the dial 36 is first rotated until the control unit 35a occupies its indicating setting, i. e., a setting wherein the detent finger 72 engages the depression 53 in the detent spring 52 of the unit. The clamping screw 78a may now be loosened and the dial 36 rotated to actuate the shaft 10 to the new setting which the control unit 35a is to identify. During such rotation of the dial, the cam follower 67 and associated detent 72 and detent spring 52 provide a locking connection between the stationary disc 59 and the actuating member 49 of the control unit 35a, thus preventing relative movement between the parts of this control unit. After the shaft 10 has been rotated to the particular setting which the control unit 35a is to identify, the clamping screw 78 may be tightened for the purpose of clamping the actuating member 49 of this control unit between the bearing ring 17 and the first bushing 75.

The manner in which the other four control units may be set to identify different desired settings of the shaft 10 is exactly the same as just explained with reference to adjustment of the control unit 35a. From this explanation it will be understood that the spring detent assembly comprising the two parts 72 and 52, as provided in each of the five control units 35a to 35e, inclusive, not only functions during normal operation of the device to provide the desired touch indication of a shaft setting with precision accuracy, but in addition, serves to restrain the control unit to permit relative adjustment between the actuating member 49 thereof and the dial 36 during the setting up operation. Thus, an exceedingly simple expedient is provided for permitting the control units to be set to identify different settings of the shaft 10 with exactness and precision.

Referring now more particularly to Figs. 9, 10 and 11 of the drawings, the modified embodiment of the invention there illustrated may also be utilized in the selective operation of the tuning shaft of a radio receiver to any one of a plurality of different settings which individually correspond to stations or signals to which the receiver is capable of responding. To this end, the actuating shaft 104 of the mechanism may be geared to the rotor shaft of the receiver tuning means through a suitable gear drive which includes the gear 105 set screw mounted upon the right end of the actuating shaft. Preferably, a low ratio driving connection is provided between the shaft 104 and the rotor shaft of the tuning means in order to insure extremely accurate positioning of the rotor shaft at any one of its several predetermined settings. For example, the drive ratio between the shaft 104 and the rotor shaft of the tuning means may be such that sixty revolutions of the shaft 104 are required in order to move the rotor shaft through a single revolution. With this drive ratio, thirty revolutions of the shaft 104 will obviously be required to rotate the rotor shaft of the tuning means between the stop defined limits of rotation thereof, assuming that the full tuning range of the tuning means may be covered by rotating the rotor shaft through an angle of 180 degrees. A finger knob 106 set screw or otherwise rigidly mounted upon the left end of the shaft 104 may be utilized to rotate this shaft for the purpose of actuating the connected rotor shaft to any one of its several predetermined settings.

In order to indicate the different predetermined settings which may be imparted to the rotor shaft of the tuning means, a plurality of control or indicating units 107a, 107b, 107c, 107d, 107e, 107f, etc., are provided which are arranged in end-to-end relationship axially along the actuating shaft 104. The rotary structure thus provided, and including the shaft 104 and certain parts of the identified control units, is rotatably supported by means of three panels 100, 101 and 102 which are spaced apart axially of the shaft 104 and are suitably tied together to provide a rigid supporting structure. More specifically, the shaft 104 is journaled within aligned openings through the three panels 100, 101 and 102, and at a point adjacent the right end thereof is provided with an annular flange 141 which bears against the panel 102 at the inner side thereof to limit end play of this shaft in one direction.

The intermediate portion of the shaft, i. e. that portion upon which the identified control or indicating units 107 are supported, is of enlarged diameter, and the left end of the enlarged portion being adapted to butt against the inner surface of the panel 101 to limit end play of the shaft in the opposite direction.

As will be evident from the above description, each of the control or indicating units 107 is adapted to identify one setting of the rotary structure, or more properly, one setting of the receiver tuning means. These units are of identical construction and arrangement. Accordingly, the arrangement thereof will be readily understood from a consideration of the control or indicating unit 107a, the parts of which are exploded and detailed in Fig. 11 of the drawings. As there shown, the selected control unit comprises an actuating member 113a which is mounted for rotation with the shaft 104, and a combination speed reducing and lost-motion mechanism. This mechanism comprises a pair of relatively rotatable gears 122a and 123a, the first of which is fixedly mounted upon the left end portion of an annular bearing sleeve 112a which rotatably supports the second gear 123a; an orbital or planetary gear 120a which is rotatably mounted by means of an axis pin 121a upon the actuating member 113a for meshing engagement with the two gears 122a and 123a; an adjustable element or gear 126a which is normally held stationary and is rigidly mounted upon the bearing sleeve 112a adjacent the right end thereof; a camming element in the form of a ring 124a which is welded or pinned to the gear 123a for rotation therewith about the sleeve 112a and is provided around its outer periphery with a cam lobe 125a; a cam follower 128a which is pivotally supported upon the adjustable element 126a by means of a pin 129a and is provided with a cam lobe 130a adapted to be engaged by the lobe 125a of the ring 124a when predetermined relative positions of the two gears 122a and 123a are established; and a detent spring member 115a which is secured to the projecting end of the actuating member 113a by means of rivets 116a and is provided with a depression or recess 119a midway along the portion 118a thereof adapted for engagement by the detent ball 132a carried by the cam follower 128a when this cam follower is actuated by the cam ring 124a. More specifically, the spring member 115a is of L-shaped cross section, and includes a vertical leg which is anchored to the projecting end of the actuating member 113a by means of the rivets 116a. The base leg of the L-shaped spring extends normal to the face of the actuating member 113a to describe a path which overlies the detent ball 132a in the manner best illustrated in Fig. 9 of the drawings. In order to enhance the resiliency of the face portion 118a of the spring 115a, this member is provided with a slot 117a which separates the two portions of the member throughout the major portion of its length. The cam follower 128a is disposed flatwise against the adjustable element 126a on the side of this element which faces the actuating member 113a, and lies partially within a recess 127a pressed into the face of the adjustable element 126a. This follower is provided with a laterally extending portion 131a upon which the semi-spherical detent ball 132a is rigidly mounted. A spring 133a, wrapped around the pivot pin 129a and having opposite ends tensioned against lugs 134a and 135a struck out from the two elements 128a and 126a, respectively, is utilized to tension the cam lobe 130a into engagement with the peripheral surface of the cam ring 124a.

All of the above identified parts of the unit 107a are supported upon a hub or bushing 108a having a flange portion 109a against which the right end of the bearing sleeve 112a is adapted to engage, and a shouldered left end portion 110a which fits within the opening 114a through the actuating member 113a. More specifically, the bushing 108a is journaled within the bearing sleeve 112a and rigidly mounts the actuating sleeve 112a and rigidly mounts the actuating member 113a upon the shouldered end portion 110a thereof. This bushing, the actuating member 113a and the parts carried by the latter member are supported for rotation with the shaft 104 in the manner described below. The gear 122a, the bearing sleeve 112a and the adjustable element 126a, on the other hand, are rigidly connected together and are held stationary. In this regard, it is noted that the gear 123a is provided with a different number of teeth than the associated gear 122a so that during operation of the actuating member 113a to rotate the planetary gear 120a about the gears 122a and 123a, the gear 123a is rotated relative to the actuating member 113a but at a much slower speed. For example, if the gear 123a is provided with thirty-one teeth and the gear 122a is provided with thirty teeth, a 30:1 drive ratio is provided between the member 113a and the gear 123a, such that the identified gear, and the cam ring 124a are rotated one revolution for each thirty revolutions of the actuating member 113a.

As indicated above, the several control or indicating units 107 are supported upon the shaft 104 in a manner such that the hubs 108 thereof are rotated with this shaft. More specifically, the hubs 108 of the respective control or indicating units are arranged in abutting end-to-end engagement along the shaft 104, with the flanged portion 109 of the hub 108f provided in the last control unit abutting the flanged portion 141 of the shaft 104. A nut 143 threaded onto the left end of the enlarged portion of the shaft 104 is arranged to coact with a lock washer 144 for the purpose of clamping the several hubs against each other and the hub 108f against the flanged portion 141 of the shaft. Thus, a locking connection is provided between the shaft 104 and the hubs 108 such that the actuating members 113 respectively carried by these hubs are rotated with the shaft 104 during rotation of this shaft.

For the purpose of normally locking the adjustable element 126a of the indicating unit 107a against rotation during rotation of the shaft 104 and the additional purpose of setting this element in different positions in the manner explained below, a combination locking and adjusting spindle 136a is provided which is journaled within aligned openings through the supporting panels 100, 101 and 102, and is provided with gear teeth 137a meshing with the gear teeth around the periphery of the adjustable element 126a. Intermediate the ends thereof, the spindle 136a is provided with a flanged portion 139a which is held in tight engagement with the back surface of the panel 100 by means of a relatively heavy coil spring 140a. This spring surrounds the spindle 136a and is held under considerable tension through engagement of the ends thereof with the flange 139a and the opposite surface of the panel 101. At the front side of the panel 100, the spindle 136a rigidly mounts a knob 138a which may be used to rotate the spindle and thus change the angular setting of the adjustable element 126a relative to the shaft 104. Corresponding locking and adjusting assemblies, including that comprising the spindle 136f, are provided for adjustably locking the adjustable elements 126 of the other indicating units in set positions during rotation of the shaft 104. These assemblies are arranged about the adjustable elements 126 of the respective indicating units so that the actuating knobs 138 thereof form a circle about the shaft actuating knob 106 at the front side of the panel 100. The spindles are respectively provided with gear teeth which mesh with the gear teeth of different ones of the adjustable elements 126, so that each indicating unit may be individually adjusted to identify different predetermined settings of the tuning means embodied in the associated radio receiver.

In considering the operation of the mechanism shown in Figs. 9, 10 and 11 of the drawings, it will be readily understood that when the knob 106 is rotated to rotate the shaft 104, the gear connected rotor shaft of the associated tuning means is operated toward the desired setting but at a much slower speed. As rotation of the shaft 104 is continued to move the rotor shaft from one end of its range of movement to the other, the respective control units provide touch indication of the different predetermined settings of the tuning means which they are respectively set to identify. In this regard, it will be apparent from the foregoing explanation that the actuating members 113 of the respective units are all rotated with the shaft 104. As the actuating member 113a of the indicating unit 107a, for example, is rotated with the shaft 104, the orbital or planetary gear 120a carried thereby is rotated about the stationary gear 122a and the rotatable gear 123a. As a result, the gear 123a and the cam ring 124a connected therewith are rotated relative to the adjustable element 126a and the stationary gear 122a at a rate of one revolution for each thirty revolutions of the shaft 104. So long as this shaft is being rotated over a portion of its operating range which does not include the predetermined rotor shaft setting to which the indicating unit 107a corresponds, the cam lobe 130a of the cam follower 128a rides upon the peripheral edge of the cam ring 124a out of engagement with the lobe 125a. Thus the spring 133a acts to hold the detent ball 132a in a position such that it cannot engage the portion 118a of the spring member 115a. As the shaft 104, or more properly the rotor shaft of the tuning means, is rotated to the particular setting which the unit 107a is set to identify, the cam ring 124a is rotated to a position wherein the lobe 125a engages the lobe 130a of the cam follower 128a. Such engagement of the two lobes 125a and 130a initially occurs at the start of the last revolution of the shaft 104 required to rotate the rotor shaft to the exact angular setting which the control or indicating unit 107a is to identify. It occurs, moreover, regardless of the direction in which the cam ring 124a is being rotated relative to the adjustable element 126a. As two of the camming surfaces of the two lobes 125a and 128a are moved into engagement, the free end of the cam follower 128a is moved radially outward from the shaft 104 to a position such that during the final portion of the indicated last revolution of the shaft 104, the detent ball 132a engages the portion 118a of the spring member 115a. Thereafter and when the rotor shaft is exactly positioned in the setting to which the unit 107a corresponds, the detent ball 132a drops into the depression 119a provided centrally of the portion 118a of the spring member 115a. Thus, a yielding stop connection is provided by the detent parts 132a and 118a when the rotor shaft of the tuning means is exactly and precisely set in one of its predetermined settings. This yielding stop connection serves to resist continued rotation of the shaft 104, so that a touch indication is provided which informs the operator that a predetermined setting of the shaft 104 has been reached.

If the particular rotor shaft setting identified by the unit 107a in the manner just explained happens not to be the desired setting, rotation of the shaft 104 may be continued in the same direction until the desired setting, as identified through the action of another of the control units, is reached. In this regard it will be understood that following engagement of the detent parts 132a and 118a, and particularly when the detent ball is seated in the depression 119a, an increase in the force exerted upon the knob 106 is required to continue rotation of the shaft 104 in the same direction. The extent of this increased force is of course determined by the stiffness of the spring portion 118a. After engagement of the detent ball 132a and the depression 119a and during continued rotation of the shaft 104, the lobe 125a of the ring 124a rides from beneath the lobe 130a of the cam follower 128a, thus permitting the wire spring 133a to retract the follower radially inward to a position such that the detent ball is no longer disposed in the path of movement of the spring portion 118a. This operation is completed during the first revolution of the shaft 104 which follows engagement of the detent ball 133a with the spring depression 119a.

The manner in which the several other control or indicating units function to provide touch indications identifying other predetermined settings of the rotor shaft intermediate the limits of the rotational range of this shaft, is exactly the same as just explained with reference to the mode of operation of the unit 107a. From this explanation it will be understood that as the shaft 104 and the rotor shaft of the tuning means are rotated in one direction throughout their respective rotational ranges, the various control or indicating units are concurrently operated and function successively to provide the desired indications identifying the different settings of the tuning means. It will also be apparent that each control or indicating unit will function to provide the desired touch indication regardless of the direction of rotation of the shaft 104. If desired, these touch indications may be supplemented through the provision of a visual turn indicating mechanism similar to that embodied in the mechanism shown in Figs. 1 to 8, inclusive, of the drawings and comprising the two meshing gears 25 and 27. This mechanism may be geared to the shaft 104 through the take-off gear 105 to be rotated by the shaft 104 at a reduced speed, and the indicating plate or part thereof may be provided with a scale which is calibrated either in terms of revolutions of the shaft 104, stations which the associated receiving equipment is capable of receiving, or numerically designated signal channels.

In order to provide for adjustment of the adjustable elements 126, thereby to change the rotor shaft settings to which the units individually correspond, the combination locking and adjusting spindles 136 individual to these units may be selectively and individually actuated. Thus, in order to change the setting of the adjustable element 126a to provide for the identification of a different predetermined setting of the rotor shaft by the control unit 107a, the knob 106 is first operated to rotate the shaft 104 until this control unit occupies its indicating setting, i. e. a setting wherein the detent ball 132a is seated within the depression 119a of the spring member 115a. The spindle 136a may now be rotated through finger manipulation of the knob 138a to rotate the adjustable element 126a, the shaft 104 and the rotor shaft of the tuning means until the latter shaft occupies the new setting which the control or indicating unit 107a is to identify. During such rotation of the spindle 136a, the cam follower 128a, the detent ball 132a, the spring member 115a and the actuating element 113a provide a driving connection between the adjustable element 126a and the shaft 104, and also positively prevent relative movement between the parts of the indicating unit 107a. After the shaft 104 and the rotor shaft of the tuning means have been rotated to the particular setting which the unit 107a is to identify, finger manipulation of the knob 138a is arrested. In this regard, it will be understood that the frictional engagement between the flange 139a and the inner surface of the panel 100 serves to lock the adjustable element 126a against rotation when the shaft 104 is rotated through finger manipulation of the knob 106. The manner in which each of the other control or indicating units may be set to identify different desired settings of the rotor shaft is exactly the same as just explained with reference to adjustment of the control or indicating unit 107a.

From the preceding explanation it will be apparent that in both of the two disclosed embodiments of the invention, the control units occupy a minimum of space and yet are exceedingly accurate in the performance of their indicating functions. It will also be understood that in neither embodiment of the invention is it essential that the rotary structure or any part thereof be utilized as an element in the connection through which the settable element or shaft is actuated. Thus, the device disclosed in Figs. 1 through 8 of the drawings may be driven from a take-off gear provided at any correct point in a gear train for operating the tuning means of a radio receiver, for example, without in any way detracting from the discharge of its indicating functions and without performing any motion transmitting function in the gear train. In such case, a driving gear of suitable size may be substituted for the dial 36 in the rotary structure of the device. Further, the two embodiments of the invention are not limited in their use to the indication of the different signal channels to which a radio receiver may be tuned, but may be employed in any application where accurate indication of a number of predetermined but changeable settings of a settable element over a wide range of revolutions must be obtained from a device of small size, light weight and low cost.

While different embodiments of the invention have been disclosed, it will be understood that various modifications may be made therein, which are within the true spirit and scope of the invention.

I claim:

1. In a tuning system for radio apparatus, a rotatable structure which is rotatable through a number of revolutions and has a number of predetermined settings which may be separated from each other by rotational angles exceeding a full revolution of said structure, and motion restraining mechanisms individually corresponding to said different settings, each of said mechanisms including a rotatable member driven at a speed slower than that of said rotatable structure and a pair of relatively movable elements engageable to indicate one of such settings, one of said elements being actuated directly in accordance with rotation of said rotatable structure and the other being actuated directly in accordance with rotation of said rotatable member, whereby the said pairs of elements are individually and successively moved into engagement as said structure is rotated through the respective corresponding settings.

2. In a tuning system for radio apparatus, a rotatable structure which is rotatable through a number of revolutions and has a number of predetermined settings which may be separated from each other by rotational angles exceeding a full revolution of said structure, motion restraining mechanisms individually corresponding to said different settings, and lost-motion means including relatively rotatable parts carried by said structure and actuated by rotation of said structure for individually and successively actuating said mechanisms as said structure is rotated through the respective corresponding settings.

3. In a control device, a rotatable structure which is rotatable through a number of revolutions between defined limits and includes a number of predetermined intermediate settings which may be separated from each other by rotational angles exceeding a full revolution of said structure, a plurality of lost-motion mechanisms concurrently actuated by rotation of said structure and each having a free travel range which substantially equals the rotational range of said structure, motion restraining mechanisms individually corresponding to said settings and individually having relatively movable elements movable into engagement to indicate each such setting, and actuators controlled by said lost-motion mechanisms to be successively engaged to effect relative movement of said elements of said restraining mechanisms only as said structure is rotated through the respective corresponding settings from one limit of its rotational range to the other.

4. In a tuning system for radio apparatus, a rotatable structure which is rotatable through a number of revolutions and has a number of predetermined settings which may be separated from each other by rotational angles exceeding a full revolution of said structure, motion restraining mechanisms individually corresponding to said different settings and having relatively movable elements movable into engagement to indicate each such setting, differential mechanisms individual to said settings and concurrently actuated during rotation of said structure, and means separately controlled by different ones of said differential mechanisms for individually and successively effecting relative movement of said elements of said restraining mechanisms only as said structure is rotated through the respective corresponding settings.

5. In a tuning system for radio apparatus, a rotatable structure which is rotatable through a number of revolutions and has a number of predetermined settings which may be separated from each other by rotational angles exceeding a full revolution of said shaft, motion restraining mechanisms individually corresponding to said different settings, differential mechanisms individual to said settings and concurrently actuated during rotation of said structure, and rotatable cams separately controlled by different ones of said differential mechanisms and engageable with the respective associated restraining mechanisms as said structure is rotated through the respective corresponding settings.

6. In combination with a rotatable structure which is rotatable through a number of different predetermined settings at least two of which are separated from each other by a rotational angle exceeding a full revolution of said shaft, indicating means comprising a plurality of indicating devices individually corresponding to said settings, each of said devices including a rotatable member driven at a speed slower than that of said rotatable structure and a pair of relatively movable elements engageable to indicate one of such settings, one of said elements being actuated directly in accordance with rotation of said rotatable structure and the other being actuated directly in accordance with rotation of said rotatable member, whereby the said pairs of elements are individually and successively moved into engagement as said structure is rotated through the respective corresponding settings.

7. In combination with a reversely rotatable structure which is rotatable in either direction through a number of revolutions between defined limits and has a number of predetermined intermediate settings which may be separated from each other by rotational angles exceeding a full revolution of said structure, a plurality of speed-reducing mechanisms concurrently actuated by rotation of said structure and each corresponding to one of said settings, a plurality of indicating devices individually corresponding to said settings each including a pair of relatively movable elements movable into engagement to indicate each such setting, one of said elements being actuated directly in accordance with rotation of said rotatable structure and the other being actuated by one of said speed-reducing mechanisms, whereby the said pairs of elements are individually and successively moved into engagement as said structure is rotated in either direction over its defined rotational range.

8. In combination with reversely rotatable means which is rotatable in either direction through a number of revolutions and has a number of predetermined intermediate settings which may be separated from each other by rotational angles exceeding a full revolution of said rotatable means, indicating devices individual to said settings and having relatively movable elements movable into engagement to indicate each such setting, speed reducing mechanisms individual to said settings and concurrently actuated during rotation of said rotatable means, and means separately controlled by said speed reducing mechanisms for individually effecting relative movement of said elements of said indicating devices as said rotatable means is rotated in either direction to the respective corresponding settings.

9. In combination with a reversely rotatable structure which is rotatable in either direction through a number of revolutions and has a number of predetermined intermediate settings which may be separated from each other by rotational angles exceeding a full revolution of said structure, indicating devices individual to said settings and each movable between a non-indicating position and an indicating position, means supporting said indicating devices about said structure, differential mechanisms individual to said settings and carried by said structure to be concurrently actuated during rotation of said structure, and means separately controlled by said differential mechanisms for individually operating said indicating devices from their non-indicating settings to their indicating settings as said structure is rotated in either direction to the respective corresponding settings.

10. In a device for indicating a plurality of different settings of a reversely rotatable structure, a supporting member having front and back sides and provided with viewing windows therethrough which are arranged about the axis of rotation of said structure, control units carried by said structure in end to end relationship to the front side of said member for actuation by rotation of said structure, pivot rods at least partially supported by said member and disposed around said control units to extend longitudinally of said structure away from the front side of said member, and indicating devices individual to said shaft settings and supported upon different ones of said pivot rods, each of said devices including an indicating portion extending to the back side of said member for movement into a viewing position through one of said windows, and means included in said control units for separately and individually operating the indicating portions of said devices into their viewing positions as said structure is successively rotated to the respective corresponding settings.

11. In a device for indicating one setting of a reversely rotatable structure, a pair of relatively rotatable gears having different numbers of teeth, an actuating element synchronously rotated with said structure, a planetary gear rotatably supported upon said actuating element for meshing engagement with said pair of gears, whereby relative rotation between said pair of gears is produced in response to operation of said actuating element about said pair of gears, yielding detent means having relatively movable elements movable into engagement for providing a touch indication of the setting of said structure, and means for effecting relative movement of said elements only as said gears are moved into predetermined relative positions determined by said one setting of said structure.

12. In a device for indicating one setting of a reversely rotatable structure, a pair of relatively rotatable gears having different numbers of teeth, an actuating element synchronously rotated with said structure, a planetary gear rotatably supported upon said actuating element for meshing engagement with said pair of gears, whereby relative rotation between said pair of gears is produced in response to operation of said actuating element about said pair of gears, visual indicating means movable radially with respect to the axis of rotation of said structure to an indicating position, and camming means rotatable with one of said gears to actuate said indicating means into said indicating position in response to movement of said gears into predetermined relative positions determined by said one setting of said structure.

13. In a device for indicating one setting of reversely rotatable means, a pair of relatively rotatable gears having different numbers of teeth, an actuating element synchronously rotated with said rotatable means, a planetary gear rotatably supported upon said actuating element for meshing engagement with said pair of gears, whereby relative rotation between said pair of gears is produced in response to operation of said actuating element about said pair of gears, means having relatively movable elements movable into engagement to provide both touch and visual indications of the setting of said rotatable means, and means responsive to relative movement of said pair of gears for actuating said indicating means only when said gears are moved into predetermined relative positions determined by said one setting of said rotatable means.

14. In a device for indicating one setting of a reversely rotatable and manually operable control structure, a pair of relatively rotatable gears having different numbers of teeth and concentrically supported upon said structure, an actuating member carried by said structure for rotation therewith, a planetary gear supported upon said actuating member for meshing engagement with said gears, whereby relative rotation between said pair of gears is produced in response to operation of said actuating member to rotate said planetary gear about said pair of gears, a camming element rotatable with one of said gears, a cam follower actuated by said camming element from one position to a second position in response to the operation of said gears into predetermined relative positions determined by said one setting of said structure, and yielding detent means actuated in response to the movement of said cam follower to said second position to provide a touch indication of the position of said structure.

15. In a control device, a rotatable structure, a disc supported upon said structure for relative movement therebetween, means holding said disc stationary, a cup-shaped member mounted for rotation with said structure and provided with a rim facing toward said disc, a differential gear mechanism disposed within the space between said disc and member to one side of said disc and actuated by rotation of said structure, a camming element disposed upon the other side of said disc for actuation by said mechanism at a speed less than speed of rotation of said structure, a cam follower movably supported upon said disc and provided with one portion disposed upon said other side of said disc for actuation by said cam and with a second portion disposed upon said one side of said disc, and a leaf spring mounted upon said member to define a chord at the inner side of said rim, said spring being provided with an indented portion arranged for yielding engagement with said second portion of said follower during actuation of said follower by said cam.

16. In a control device, a rotary control shaft, a rotatable structure, means supporting said shaft and said structure for relative rotary movement about the same axis, a plurality of differential mechanisms stacked end to end longitudinally of said structure and all actuated by rotation of said structure, one of said mechanisms providing a low speed driving connection between said structure and said shaft, and means controlled by the remaining mechanisms for separately indicating different predetermined angular settings of said shaft.

17. In a control device, a rotary control shaft, a rotatable structure, means supporting said shaft and said structure for relative rotary movement about the same axis, a plurality of differential mechanisms stacked end to end longitudinally of said structure and all actuated by rotation of said structure, one of said mechanisms providing a low speed driving connection between said structure and said shaft, means controlled by the remaining mechanisms for separately indicating different predetermined angular settings of said shaft, and means for individually adjusting certain corresponding parts of said remaining mechanisms relative to said structure, thereby to change the angular settings of said shaft at which indications are produced by said last-named means.

18. In a tuning system for radio apparatus, a rotatable structure which is rotatable through a number of revolutions and has a number of predetermined settings which may be separated from each other by rotational angles exceeding a full revolution of said structure, motion restraining mechanisms individually corresponding to said different settings, each of said mechanisms including a rotatable member driven at a speed slower than that of said rotatable structure and a pair of elements movable into registration to indicate one of such settings, one of said elements being actuated directly in accordance with rotation of said rotatable structure and the other being actuated directly in accordance with rotation of said rotatable member, whereby the said pairs of elements are individually and successively moved into engagement as said structure is rotated through the respective corresponding settings.

19. An automatic positioning mechanism for tuning radio apparatus comprising: a first rotatable member having a multi-revolution operating range; means for driving said member; means for driving a tuning element from said member; a motion restraining element mounted on said member; a second rotatable member having an operating range not exceeding one revolution; motion reducing means connecting said first and second members; a second restraining element; and means actuated by said second member for bringing said first and second motion restraining elements into registry at a preselected point in a preselected revolution of said first member, thereby to indicate a corresponding position of said tuning element.

HAROLD F. ELLIOTT.

REFERENCES CITED

The following references are of record in the file of this patent:

UNITED STATES PATENTS

| Number | Name | Date |
|---|---|---|
| Re. 22,277 | Smith | Feb. 23, 1943 |
| 1,633,890 | Ford | June 28, 1927 |
| 1,655,054 | Gargan | Jan. 3, 1928 |
| 1,747,233 | Gargan | Feb. 18, 1930 |
| 1,777,490 | Hardie | Oct. 7, 1930 |
| 1,964,449 | Carlson | June 26, 1934 |
| 2,016,149 | Leach | Oct. 1, 1935 |
| 2,062,032 | Loughlin | Nov. 24, 1936 |
| 2,155,101 | Schnell | Apr. 18, 1939 |

FOREIGN PATENTS

| Number | Country | Date |
|---|---|---|
| 6,835 of 1895 | England | Apr. 3, 1895 |
| 317,153 | Germany | Dec. 12, 1919 |